United States Patent [19]
Sasaki et al.

[11] Patent Number: 5,255,638
[45] Date of Patent: Oct. 26, 1993

[54] ENGINE OUTPUT CONTROL SYSTEM FOR VEHICLE

[75] Inventors: Junsou Sasaki; Susumi Mantoku; Kazuaki Umezono, all of Hiroshima, Japan

[73] Assignee: Mazda Motor Corporation, Hiroshima, Japan

[21] Appl. No.: 701,874

[22] Filed: May 17, 1991

[30] Foreign Application Priority Data

May 18, 1990 [JP] Japan .................................. 2-128916

[51] Int. Cl.$^5$ ...................... F02B 27/02; F02D 23/00
[52] U.S. Cl. .................... 123/52 M; 123/564
[58] Field of Search ................. 60/600, 601, 602, 603, 60/611; 123/564, 52 M

[56] References Cited

U.S. PATENT DOCUMENTS

| | | | |
|---|---|---|---|
| 4,556,038 | 12/1985 | Okamoto et al. | 60/602 X |
| 4,745,753 | 5/1988 | Tadokoro et al. | 60/602 |
| 5,090,202 | 2/1992 | Hitomi et al. | 123/564 X |

*Primary Examiner*—Michael Koczo
*Attorney, Agent, or Firm*—Sixbey, Friedman, Leedom & Ferguson

[57] ABSTRACT

An engine has a torque peak in a middle engine speed range. An engine output control system reduces the engine output torque in the middle engine speed range so that the torque characteristic curve of the engine becomes flat when the vehicle is accelerated from a low engine speed range at a low gear speed.

8 Claims, 5 Drawing Sheets

ENGINE OUTPUT CONTROL SYSTEM FOR VEHICLE

BACKGROUND OF THE INVENTION

1. Field of the Invention

This invention relates to an engine output control system for a vehicle for controlling the engine output torque characteristics according to the operating condition of the engine.

2. Description of the Prior Art

As disclosed, for instance, in Japanese Unexamined Patent Publication No. 63(1988)-50623, there has been known an engine in which the output torque of the engine is limited in the high engine speed heavy load range and is increased in the middle engine speed range by controlling the relief pressure of a supercharger and controlling the supercharging pressure according to the engine speed in view of durability of the engine.

However in an engine having a particular output torque characteristic curve such as those having a torque peak in the middle engine speed range, when the vehicle is to be accelerated over the torque peak, the torque cannot be smoothly increased and feeling of smooth acceleration cannot be obtained.

That is, when the engine has a torque characteristic curve which is fixed irrespective of manner of acceleration and has a torque peak in the middle engine speed range, fall of the output torque in the high engine speed range adversely affects the acceleration and the feeling of acceleration which the driver experiences is not satisfactory during acceleration from a low speed.

On the other hand, when the torque peak in the middle engine speed range is lowered so that the torque characteristic curve is flat in order to improve the feeling of acceleration during acceleration from a low speed, initial torque becomes too low and the feeling of acceleration deteriorates when the vehicle is accelerated from the middle speed range at a high gear-speed such as top gear.

Further, in the case of an engine which has a torque characteristic curve having a torque peak in each of the low engine speed range and the high engine speed range, the feeling of acceleration which the driver experiences is not satisfactory due to fall of the output torque in the middle engine speed range when the vehicle is accelerated from a low speed.

SUMMARY OF THE INVENTION

In view of the foregoing observations and description, the primary object of the present invention is to provide an engine output control system for a vehicle in which the feeling of acceleration during acceleration from the low speed range is improved and at the same time, better engine output torque characteristics is obtained irrespective of the operating condition of the engine.

In accordance with one aspect of the present invention, there is provided an engine output control system for an engine for a vehicle having a torque peak in a middle engine speed range comprising a gear-position detecting means which detects the gear-position of a transmission of the vehicle, an engine speed detecting means, an acceleration detecting means which detects that the vehicle is accelerated, and a torque characteristic changing means which reduces the engine output torque in the middle engine speed range so that the torque characteristic curve of the engine becomes flat when the vehicle is accelerated from a low engine speed range at a low gear speed.

When the engine has a supercharger, the torque characteristic curve can be made flat by reducing the supercharging pressure.

In accordance with another aspect of the present invention, there is provided an engine output control system for an engine for a vehicle comprising an engine speed sensor, and a torque characteristic switching means which switches engine output torque characteristics according to the engine speed so that the engine output torque changes with engine speed along a first torque characteristic curve when the engine speed is lower than a first predetermined engine speed and along a second torque characteristic curve when the engine speed is higher than a second predetermined engine speed which is higher than the first predetermined engine speed, the first torque characteristic curve having a peak in a low engine speed range lower than the first predetermined engine speed and the second torque characteristic curve having a peak in a high engine speed range higher than the second predetermined engine speed, wherein the improvement comprises that said torque characteristic switching means switches the torque characteristic curve to the second torque characteristic curve even if the engine speed is lower than the second engine speed when an acceleration detecting means detects that the vehicle is accelerated from an engine speed range higher than a third predetermined engine speed and lower than the second predetermined engine speed.

In the engine output control system in accordance with the first aspect of the present invention, when the vehicle is accelerated from an engine speed lower than the engine speed at which the engine output torque is maximized, reduction in acceleration of the engine due to fall of the engine output torque is avoided by reducing the torque at the peak in the middle engine speed range, whereby the the vehicle is smoothly accelerated from the low engine speed range and the feeling of acceleration is improved. On the other hand, when the vehicle is accelerated from an engine speed higher than the engine speed at which the engine output torque is maximized, a high engine output torque is ensured. Thus, an excellent feeling of acceleration can be obtained for accelerations from various engine speed ranges.

In the engine output control system in accordance with the second aspect of the present invention, when the vehicle is accelerated in such a manner that the engine speed increases over the valley of the torque characteristic curve between the peaks in the low engine speed range and the high engine speed range, fall of the engine output torque at the valley is avoided without adversely affecting the acceleration in the other ranges by switching the torque characteristic curve to the second torque characteristic curve even if the engine speed is in the range where the torque characteristic curve is normally to be the first torque characteristic curve.

DESCRIPTION OF THE PREFERRED EMBODIMENT

Figure 1:
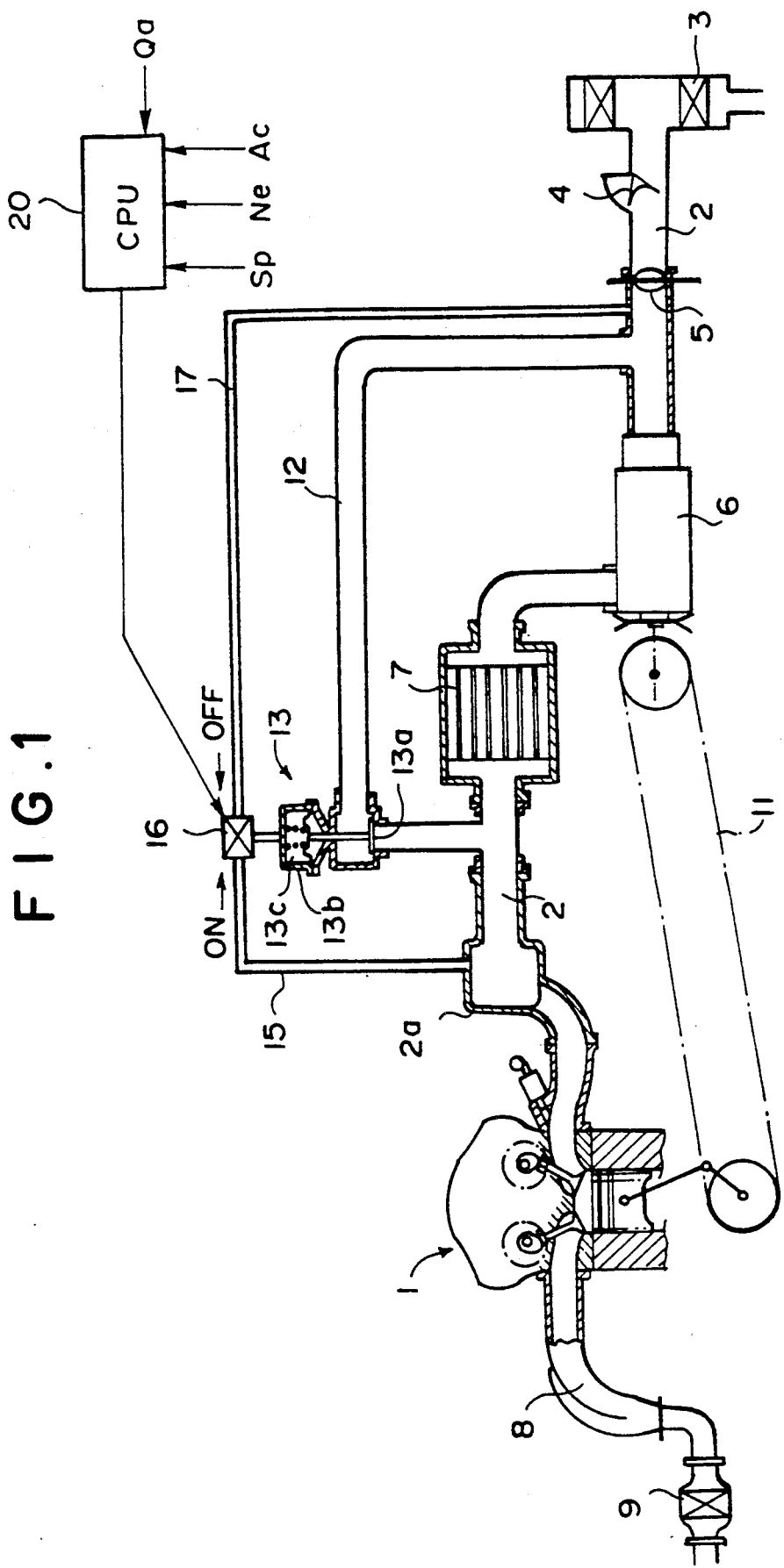
FIG. 1 is a schematic view showing an engine provided with an engine output control system in accordance with an embodiment of the present invention.

In FIG. 1, an engine 1 has a mechanical supercharger 6 and has a torque characteristic curve having a torque peak in a middle engine speed range.

The engine 1 has an intake passage 2 and an exhaust passage 8. An air cleaner 3, an airflow sensor 4, a throttle valve 5, a supercharger 6 and an intercooler 7 are disposed in the intake passage 2 in this order from the upstream side, and a surge tank 2a is provided downstream of the intercooler 7. The intake passage 2 branches downstream of the surge tank 2a into discrete intake passages which communicate with the respective cylinders of the engine 1. A catalytic converter 9 is provided in the exhaust passage 8.

The supercharger 6 is driven by the output power of the engine 1 by way of a driving mechanism 11. A relief passage 12 communicates a part of the intake passage 2 downstream of the throttle valve 5 and a part of the intake passage 2 upstream of the surge tank 2a bypassing the supercharger 6 and the intercooler 7. A relief valve 13 is provided in the relief passage 12. The relief valve 13 has a valve body 13a which is adapted degree of the valve body 13a is controlled by a diaphragm actuator 13b, thereby controlling relief of the supercharging pressure.

That is, the actuator 13b has a pressure chamber 13c and a spring which urges the valve body 13a toward the closed position in which it closes the relief passage 12. Further, a negative pressure introducing passage 17 is connected to the pressure chamber 13c and intake vacuum in the intake passage 12 downstream of the throttle valve 5 is introduced into the pressure chamber 12c. A three-way solenoid valve 16 is provided in the negative pressure introducing passage 17, and a supercharging pressure introducing passage 15 for introducing supercharging pressure in the surge tank 2a into the pressure chamber 12c is connected to the third port of the solenoid valve 16.

A controller 20 controls the three-way solenoid valve 16 to control the pressure introduced into the pressure chamber 12c. The controller 20 detects the operating condition of the engine 1 by way of an engine speed signal Ne, an accelerator position signal Ac, a gear position signal Sp which represents the gear-position of the transmission (not shown), an intake air quantity signal Qa which represents the quantity of intake air, and the like.

While the controller 20 outputs an on-signal to the three-way solenoid valve 16, the solenoid valve 16 communicates the supercharging pressure introducing passage 15 with the pressure chamber 13c of the relief valve 13, whereby the pressure in the pressure chamber 13c is increased and the supercharging pressure at which the relief valve 13 is opened is increased. On the other hand, while the controller 20 outputs an off-signal to the three-way solenoid valve 16, the solenoid valve 16 communicates the negative pressure introducing passage 17 with the pressure chamber 13c, whereby the pressure in the pressure chamber 13c is reduced and the supercharging pressure at which the relief valve 13 is opened is reduced.

Figure 2:
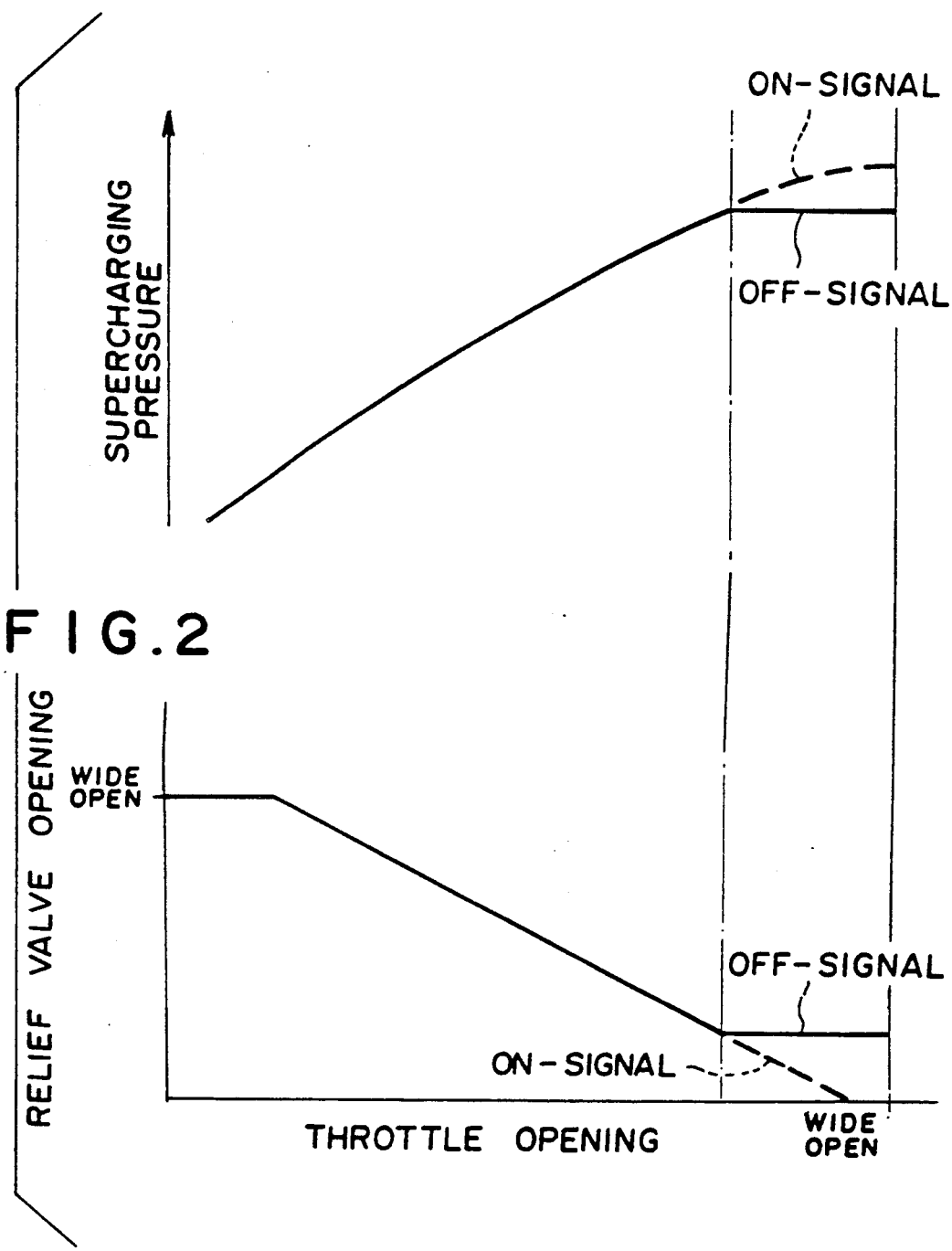
FIG. 2 is a view showing the relationship between the relief valve opening degree, the supercharging pressure and the throttle opening.

In this embodiment, as shown in FIG. 2, the controller 20 outputs the off-signal to the three-way solenoid valve 16 when the throttle opening is small and basically the intake vacuum introduced into the pressure chamber 13c is reduced as the throttle opening increases, whereby the opening degree of the relief valve 13 is reduced and the supercharging pressure is gradually increased as the throttle opening increases.

In the range where the throttle opening is wide, the relief valve 13 is fully closed and the supercharging pressure increases high as shown by the broken line in FIG. 2 so long as the controller 20 outputs the on-signal, and on the other hand, the relief valve 13 opens to a predetermined opening degree and the supercharging pressure is limited as shown by the solid line in FIG. 2 so long as the controller 20 outputs the off-signal.

Normally, the controller 20 outputs the off-signal in the range where the throttle opening is small and outputs the on-signal in the range where the throttle opening is near full so that a torque peak appears in the middle speed range. When the engine speed is lower than the engine speed at which the torque peak appears in the middle speed range and at the same time the amount of depression of the accelerator pedal (the throttle opening) is larger than a predetermined value with the transmission in first or second, the controller 20 outputs the of-signal so that the relief valve 13 opens at a lower supercharging pressure, thereby lowering the torque peak in the middle speed range so that the torque characteristic curve becomes flat.

Figure 3:
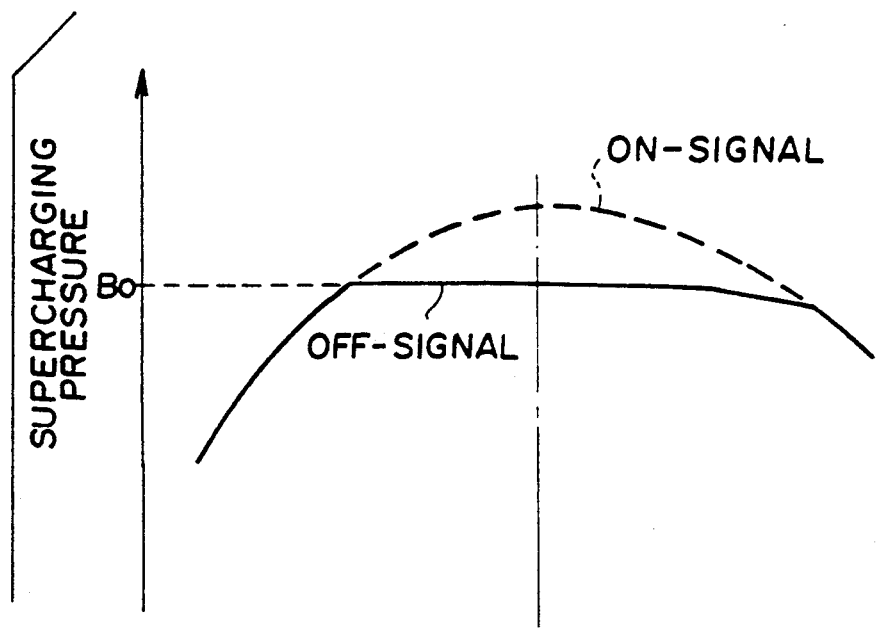
FIG. 3 is a view showing the relationship between the supercharging pressure, the engine output torque and the engine speed.
Figure 3:
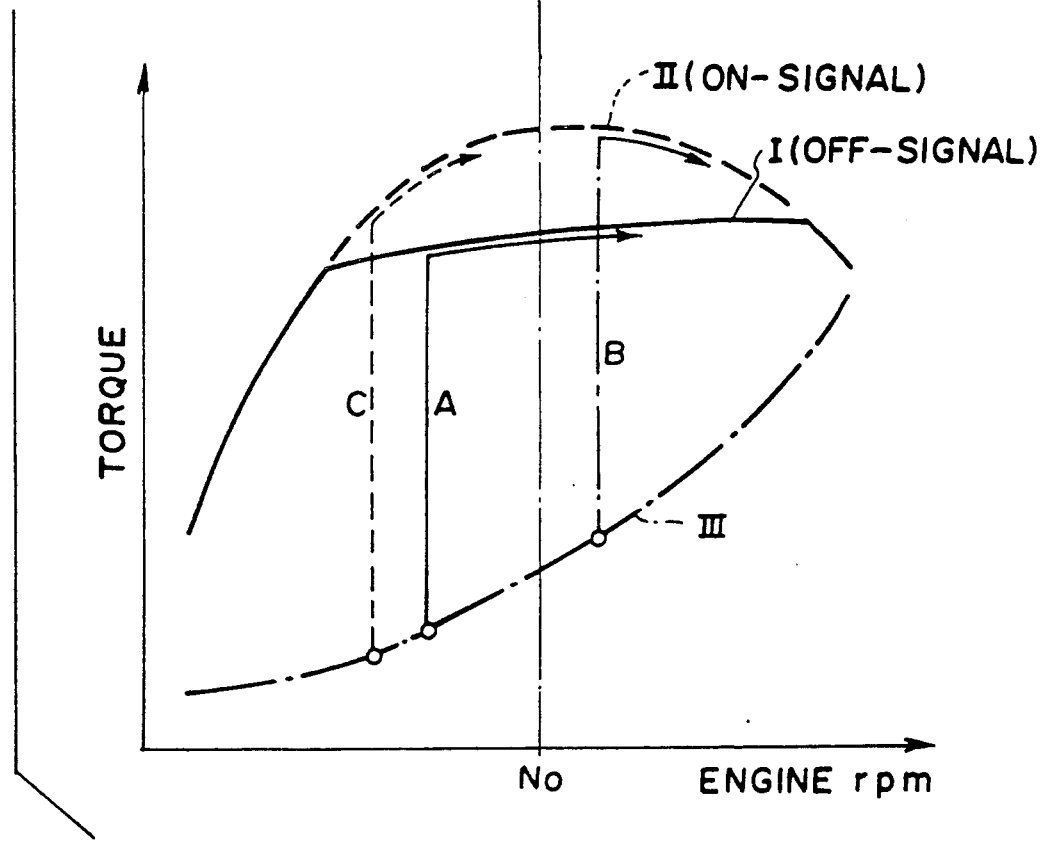

In FIG. 3, the solid lines show the changes of the supercharging pressure and the engine output torque with the engine speed when the throttle valve 5 is opened wide while the controller 20 is outputting the off-signal, and the broken lines show the same when the throttle valve 5 is opened wide while the controller 20 is outputting the on-signal.

While the controller 20 is outputting the on-signal, the pressure at which the relief valve 13 opens is increased and the relief valve 13 is substantially fully closed, whereby the supercharging pressure is maximized at an engine speed No in the middle speed range. On the other hand, while the controller 20 is outputting the off-signal, the pressure at which the relief valve 13 opens is reduced and the relief valve 13 opens to a predetermined opening degree at a preset pressure Bo, whereby the supercharging pressure is relieved through the relief passage 12 and the supercharging pressure is limited to the preset pressure Bo. Thus the supercharging pressure in the middle speed range lowers and the supercharging pressure is substantially fixed up to the high speed range.

As the supercharging pressure changes in the manner described above, the engine output torque is maximized at the engine speed No in the middle speed range like the supercharging pressure and is gradually reduced on opposite sides of the engine speed No as shown by the broken line II while the controller 20 is outputting the on-signal. On the other hand, while the controller 20 is outputting the off-signal, increase in the engine output torque is suppressed from the time the supercharging pressure reaches the preset pressure Bo, whereby the torque characteristic curve becomes flat and the engine output torque gradually increases up to the high speed range as shown by the solid line I. The curve III in FIG. 3 is a road-load line.

Since the controller 20 outputs the off-signal when the throttle valve 5 is wide opened at an engine speed lower than the engine speed No with the transmission in first or second, the engine output torque gradually increases with increase in the engine speed along the curve I as indicated by line A and the engine is smoothly accelerated from the middle speed range to the high speed range in the case of such an acceleration.

When the throttle valve 5 is wide opened at an engine speed higher than the engine speed No, the controller 20 outputs the on-signal. Accordingly, the engine output torque changes with change in the engine speed along the curve II as indicated by line B, whereby a high engine output torque is obtained at the beginning of the acceleration. In this case, when the transmission is in a low gear-speed, the engine speed reaches the maximum speed in a short time and accordingly, it is not necessary to reduce the engine output torque. On the other hand, when the transmission is in a high gear-position, the engine speed increases slowly and accordingly, the vehicle is smoothly accelerated.

When the vehicle is accelerated from the low speed range lower than the engine speed No with the transmission in a high gear-position the controller 20 outputs the on-signal and accordingly the torque characteristic is as shown by the curve II. In such an acceleration, the engine speed increases relatively gradually. Accordingly, the feeling of acceleration can be improved by ensuring a high engine output torque at the beginning of the acceleration and ensuring high engine output torque from the low to middle speed range as indicated by line C.

Though, in the embodiment described above, the torque characteristic curve is made flat by reducing the engine output torque in the middle speed range by control of the supercharging pressure, the torque characteristic curve may be made flat by reducing the air-fuel ratio in the middle speed range. This also contributes to improvement in fuel economy and emission.

Another embodiment of the present invention will be described with reference to FIG. 4, hereinbelow.

Figure 4:
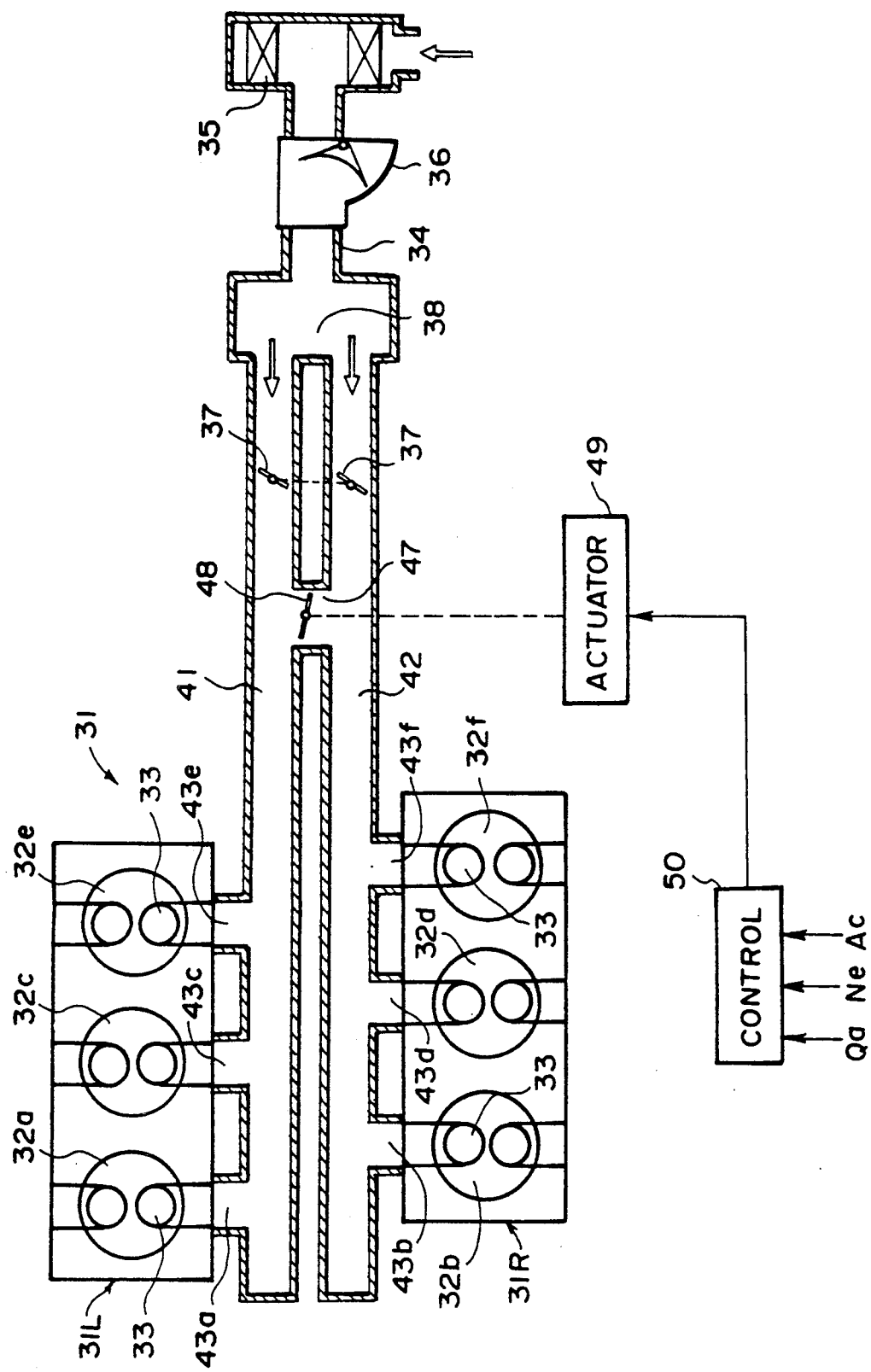
FIG. 4 is a schematic view showing an engine provided with an engine output control system in accordance with another embodiment of the present invention.

In FIG. 4, a V-6 engine has first and second cylinders banks 31L and 31R. First, third and fifth cylinders 32a, 32c and 32e are formed in the first cylinder bank 31L and second, fourth and sixth cylinders 32b, 32d and 32f are formed in the second cylinder bank 31R. The firing order is 1-2-3-4-5-6, and the cylinders in each cylinder bank do not fire one after another.

An intake passage 34 for supplying intake ports 33 for the cylinders 32a to 32f with intake air branches into first and second resonance intake passages 41 and 42 at a junction 38 (a surge tank), and is provided with an air cleaner 35 and an airflow sensor 36 upstream of the junction 38. Each of the first and second resonance intake passages 41 and 42 is provided with a throttle valve 37. Discrete intake passages 43a, 43c and 43e respectively communicate the cylinders 32a, 32c and 32e with the first resonance intake passage 41. Similarly, discrete intake passages 43b, 43d and 43f respectively communicate the cylinders 32b, 32d and 32f with the second resonance intake passage 42. The junction 38 functions as a pressure wave reflecting portion for resonance supercharging effect.

A communicating passage 47 communicates the first and second resonance intake passages 41 and 42 upstream of junctions of the discrete intake passages 43a to 43f to the resonance intake passages 41 and 42 and downstream of the junction 38. An on-off valve 48 is provided in the communicating passage 47 to open and close the same.

An actuator 49 opens and closes the on-off valve 48 under the control of a controller 50. The controller 50 detects the operating condition of the engine 31 by way of an engine speed signal Ne, an accelerator position signal Ac, an intake air quantity signal Qa which represents the quantity of intake air, and the like.

While the controller 50 is outputting a closing signal to the actuator 49, the actuator 49 causes the on-off valve 48 to close, thereby breaking the communication between the first and second resonance intake passages 41 and 42 through the communicating passage 47. In this state, the resonance intake passages 41 and 42 communicate with each other through the junction 38 and form a natural frequency system having a large passage length which tunes to the engine speed in the low engine speed range, whereby a resonance supercharging effect is obtained in the low engine speed range. On the other hand, while the controller 50 is outputting an opening signal to the actuator 49, the actuator 49 causes the on-off valve 48 to open, thereby causing the first and second resonance intake passages 41 and 42 to communicate through the communicating passage 47. In this state, the length of the passage through which the pressure wave propagates is reduced and another resonance supercharging effect is obtained in the high engine speed range.

Basically the controller 50 outputs the closing signal when the engine speed is lower than a second preset engine speed Nb in the middle speed range and outputs the opening signal when the engine speed exceeds the second preset engine speed Nb.

Accordingly, in the low engine speed range, the on-off valve 48 is closed and a resonance supercharging effect is obtained in the low engine speed range. That is, pressure waves generated in the cylinders 32a to 32f propagate the respective resonance intake passages 41 and 42 and reflect at the junction 38 to act the pressure in the intake port at the end of the intake stroke, whereby the charging efficiency is increased. Thus, in this state, the torque characteristic of the engine has a peak in the low engine speed range as shown by curve IV in FIG. 5. In the high engine speed range, the on-off valve 48 is opened and the first and second resonance passages 41 and 42 communicate each other through the communicating passage 47, whereby the length of the passage through which the pressure wave propagates is reduced and another resonance supercharging effect is obtained in the high engine speed range. Thus, in this state, the torque characteristic of the engine has a peak in the high engine speed range as shown by curve V in FIG. 5.

The controller 50 outputs the opening signal even if the engine speed is lower than the second preset engine speed Nb so long as the engine speed is higher than a first preset engine speed Na, which is slightly lower than the engine speed at which the engine output torque is maximized in the low engine speed range, and at the same time, the vehicle is accelerated with the throttle valve opened by a degree larger than a predetermined value. Thus the engine output torque is changed with engine speed according to the torque characteristic shown by the curve V during such an acceleration.

Figure 5:
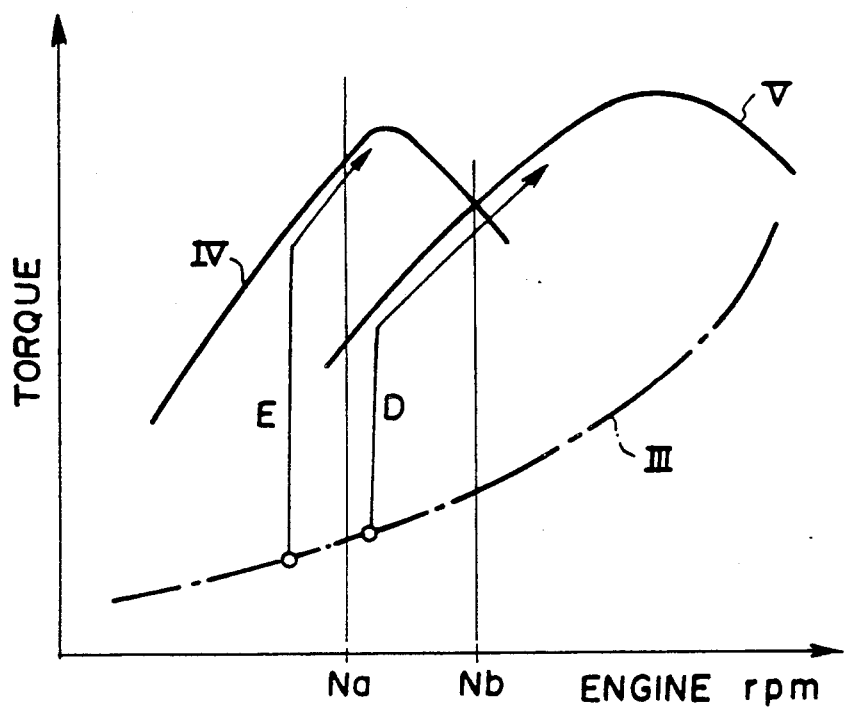
FIG. 5 is a view showing the relationship between the engine output torque and the engine speed in the embodiment shown in FIG. 4.

When the vehicle is accelerated with the throttle valve opened wide from a state where the engine speed is between the first and second preset engine speeds Na and Nb, the controller 50 outputs the opening signal and accordingly, the torque characteristic curve becomes as shown by the curve V in FIG. 5. Thus in such an acceleration, the engine output torque increases with increase in the engine speed along the curve V from the middle speed range to the high speed range as indicated by line D, whereby the engine is smoothly accelerated to smoothly accelerate the vehicle.

When the vehicle is accelerated with the throttle valve opened wide from a state where the engine speed is lower than the first preset engine speed Na, the engine output torque first increases along the curve IV as indicated by line E until the engine speed reaches the second preset engine speed Nb and the on-off valve 48 is opened, and then increases along the curve V. When the torque characteristic shown by the curve V is used in the low engine speed range lower than the first preset engine speed, the engine output torque is too low at the beginning of acceleration to obtain a sufficient acceleration.

Though, in this embodiment, the tuning engine speed is changed to change the torque characteristic curve by opening and closing the communicating passage 47, the tuning engine speed may be changed by other methods.

We claim:

1. An internal combustion engine output control system for an engine for a vehicle comprising
   an engine speed detecting means for detecting an engine speed of the engine,
   an acceleration detecting means for detecting that the vehicle is accelerating,
   a torque characteristic changing means for changing a torque characteristic thereby reducing a maximum amount of burning constituent supplied to the engine, said torque characteristic changing means operating only when the engine speed is lower than a certain engine speed, and
   a control means for operating the torque characteristic changing means if the engine speed detecting means detects a relatively low engine speed lower than said certain engine speed when the acceleration detecting means starts to detect the vehicle acceleration;
   wherein said engine has an intake system which has first and second passages through which a pressure wave generated in the intake stroke of each cylinder propagates, the engine output torque being maximized in the low engine speed range by kinetic effect of intake air when the pressure wave propagates through the first passage and in the high engine speed range by kinetic effect of intake air when the pressure wave propagates through the second passage, and said torque characteristic changing means changes the first and second passages according to the engine speed.

2. An engine output control system as defined in claim 1 in which said engine has an intake system comprising a pair of resonance intake passage which respectively communicate with first and second groups of cylinders of the engine, the cylinders in each group not firing one after another, the resonance intake passages being adapted to communicate with each other through first and second communicating passages, the second communicating passage being provided with an on-off valve which opens and closes to open and close the second communicating passage, the first and second resonance intake passages forming a long resonance system, when the on-off valve is closed, with which resonance supercharging effect is obtained in said low engines speed range and forming a short resonance system, when the on-off valve is opened, with which resonance supercharging effect is obtained in said high engine speed range, and said torque characteristic switching means switches the engine output torque characteristics by opening and closing the on-off valve.

3. An engine output control system as defined in claim 4, wherein said relatively low engine speed is lower than the engine speed at which a torque peak is attained.

4. An engine output control system as defined in claim 1, wherein said burning constituent is air.

5. An engine output control system as defined in claim 1, wherein said relatively low engine speed is lower than the engine speed at which a torque peak is attained.

6. An engine output control system as defined in claim 1, wherein said burning constituent is air.

7. An internal combustion engine output control system for an engine for a vehicle having a torque peak in a middle engine speed range comprising
   a gear-position detecting means for detecting the gear-position of a transmission of the vehicle.
   an engine speed detecting means for detecting an engine speed of the engine,
   an acceleration detecting means for detecting that the vehicle is accelerating,
   a torque characteristic changing means for changing a torque characteristic thereby reducing a maximum amount of burning constituent supplied to the engine, said torque characteristic changing means operating only when the engine speed is lower than a certain engine speed, and
   a control means for operating the torque characteristic changing means when the gear position detecting means detects a relatively low gear position if the engine speed detecting means detects a relatively low engine speed lower than said certain engine speed when the acceleration detecting means starts to detect the vehicle acceleration.

8. An engine output control system as defined in claim 7 in which said engine is provided with a supercharger and said torque characteristic changing means reduces the engine output torque by reducing the supercharging pressure.

* * * * *